(12) United States Patent
Chartrand

(10) Patent No.: US 7,889,855 B1
(45) Date of Patent: Feb. 15, 2011

(54) DIRECT TELEPHONE DIALING BY NAME

(76) Inventor: Victor Chartrand, POB 5777, La Quinta, CA (US) 92248

( * ) Notice: Subject to any disclaimer, the term of this patent is extended or adjusted under 35 U.S.C. 154(b) by 0 days.

(21) Appl. No.: 12/462,549

(22) Filed: Aug. 5, 2009

Related U.S. Application Data

(60) Provisional application No. 61/188,202, filed on Aug. 5, 2008.

(51) Int. Cl.
*H04M 3/42* (2006.01)
(52) U.S. Cl. .............. 379/211.01; 379/211.02; 379/221.01; 379/221.14; 379/100.09
(58) Field of Classification Search ............ 379/100.09, 379/211.01, 211.02, 221.01, 221.14
See application file for complete search history.

(56) References Cited

U.S. PATENT DOCUMENTS

| | | | |
|---|---|---|---|
| 3,634,631 A | 1/1972 | Youngs | |
| 3,870,821 A | 3/1975 | Steury | |
| 5,018,191 A | 5/1991 | Catron et al. | |
| 5,467,390 A | 11/1995 | Brankley et al. | |
| 5,583,925 A * | 12/1996 | Bernstein | 379/202.01 |
| 7,039,174 B1 | 5/2006 | Chartrand | |

* cited by examiner

*Primary Examiner*—Quynh H Nguyen
(74) *Attorney, Agent, or Firm*—Robert M. Hunter

(57) ABSTRACT

By using letters, this invention provides telephone numbers that contain the actual initials or name of the recipient. With business subscribers, each company's stock marker ticker symbol is their telephone number, such as 'GE' for General Electric. With most individual accounts, the telephone number consists of the subscriber's initials plus date of birth. Custom programming routes a call with the simple dialing input of only the recipient's initials or name. Only one well-defined area code is needed per State, such as 'AZ' for Arizona. The same number is used for landline, facsimile, internet, and cellular connections.

23 Claims, 1 Drawing Sheet

DIRECT TELEPHONE DIALING BY NAME

CROSS-REFERENCE TO RELATED APPLICATIONS

This application claims the benefit of U.S. Provisional Patent Application No. 61/188,202, filed Aug. 5, 2008, the disclosure of which patent application is incorporated by reference as if fully set forth herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

This invention relates to telecommunication systems and methods. In particular, the invention relates to telecommunication systems and methods that rely on direct telephone dialing by name.

The ongoing background art is characterized by U.S. Pat. Nos. 3,634,631; 3,870,821; 5,018,191; 5,467,390 and 7,039,174; the disclosures of which patents are incorporated by reference as if fully set forth herein.

BRIEF SUMMARY OF THE INVENTION

The purpose of an illustrative embodiment of the invention is to provide an improved telecommunications system that relies on area codes that have meaning. One advantage of an illustrative embodiment of the invention is that area codes would be more memorable.

In an illustrative embodiment, the invention is a system and method for receiving telephone user input and routing telephone calls. In a telecommunications system that is capable of routing telephone calls to a communications device of a particular subscriber, an illustrative embodiment of the invention is a system for routing a telephone call from a caller to said specific communications device, said system comprising: means for assigning a first telephone number to the particular subscriber; and means for routing the telephone call to the specific communications device of the particular subscriber said means for routing being programmed to recognize a subscriber's name; wherein said subscriber's name is a sequence of characters established in accordance with one of the schemes disclosed herein.

Illustrative embodiments of the invention provides major advances in telephone technology that include: telephone numbers of only one to four characters to reach 10,000 companies, fully permanent telephone numbers by name for individuals and companies, one single telephone number to cover landline, facsimile, internet, and cellular calls, the reduction of over 300 area codes to one permanent area code per State, and the use of only a recipient's two initials or first name to dial a call. Since the telephone number of an individual subscriber preferably comprises his or her birth date, it is permanent from the day one was born for life.

With the present system of using numbers for telephone numbers, there is no way of addressing business or individuals by name. By using letters of the alphabet, an illustrative embodiment of the invention makes most major U.S. companies capable of being reached directly, with an updated landline or cellular telephone, by simply dialing their stock market ticker symbol (ticker). For example, in accordance with an illustrative embodiment of the invention, the following are used to reach the indicated company: GE (General Electric), F (Ford Motor), GOOG (Google), IBM (IBM), INTC (Intel), KO (Coca-Cola), MSFT (Microsoft), SNE (Sony), T (AT&T), TGT (Target), WMT (Wal-Mart), YHOO (Yahoo!), etc.

There are over 10,000 companies that are already assigned a letters-only ticker symbol, that are readily available to become the actual phone number of each company. In an illustrative embodiment, the telephone numbers of businesses are distinguished from those of individuals by using a prefix such as the equivalence (tilde) mark '~', or any other (preferably non-letter and non-digit) character that is available on the ASCII chip. In this embodiment, to get GE's national and local options, calls would be routed directly to their corporate or other office in Connecticut simply by dialing 1CT~GE. If the State is unknown, the dialer would use XX for the State and dial 1XX~GE. Preferably, in this situation, a memory bank in the call routing software of the telephone company provides the correct routing address by converting the XX to CT (Connecticut). In a preferred alternative embodiment, a caller can establish a direct connection with a major company like General Electric, without using an area code, simply by dialing ~GE.

Other State area codes are envisioned, such as 1AZ~GE for information in Arizona. In this embodiment, in one's home State, no area code is required. The '1' notifies the routing software that the first two letters are area codes for long distance. In all routings, companies should preferably offer their ticker numbers as toll free numbers.

The ticker's use of 26 letters and three or four digits provides a vast and apt reserve of 474,552 ticker symbols. Only 676 tickers with one or two digits are available, yet many of these are not currently in use. Thus, for major private or other unlisted companies, an unused ticker symbol is available.

In an illustrative embodiment, the invention utilizes the present 10-character telephone numbers that include: two characters such as 'CA' for the State area code, one character '~' to signify business telephone numbers, four digits maximum for the ticker symbol which does the routing of the call, and three unused characters 'xxx' such as CA~GOOGxxx. With Ford Motor Company's one-character ticker, there would be a rare surplus of six unused characters, that Ford could utilize, such as CA~Fxxxxxx. In an illustrative embodiment, the first character following the upper-case ticker characters, is a lower case letter or a number or a dot '.' to isolate a company's ticker or other symbol from the other characters, for example, ~GErm or ~GE.RM, and so insure proper call routing. Only 26 one-character tickers are available and in case their use is not practical or feasible, in an illustrative embodiment one extra character '~' is added, such as '~F~'. Keyboards have the '~' key.

A major breakthrough is the use of short ticker symbols that allow companies to customize the unused portion, shown as 'xxx' above, of their incoming telephone number. Depending on ticker length, three to six unused characters are available, which can be coded to greatly reduce consumer hang time by bypassing answering machines and switchboards and by accelerating the routing to contacts in the company.

In another illustrative embodiment wherein the telephone number comprises a four-character ticker, three-character directives are created as follows: initials '.RM' such as CA~GOOG.RM, extension number '234' such as CA-GOOG234, initials 'rml' in case of a duplication, lower case of both initials with a dot '.rm' for a facsimile, a positive directive for 'fax' or 'cel', the city initials and store number such as 'psi' for Palm Springs location 1, the owner or associate's name such as 'bob' or 'sue', a company department such as '.OP' for operator or '.CS' for customer service such as CA~GOOG.CS, etc. Preferably, non-ticker companies use seven characters to form their title symbol and directive code.

In another illustrative embodiment, individuals are assigned national telephone numbers based on their initials. In this embodiment, a telephone number comprises the two-character State code (e.g., CA for California) plus user's two-character initials plus user's birth date consisting of 2 digits for the year born plus month plus day such as caRM51j01 for a landline telephone of a person born Jan. 1, 1951. The 'CA' code may be either case and would not be required for calls in California, thus, a call to a local cellular number is dialed as rm51j01. In a more illustrative embodiment upper case initials are used for landline telephone numbers and lower case initials for cellular telephone numbers. The more frequent-used cellular calls may be typed faster in lower case because they do not require the shift key for upper case. In this embodiment, the one-character code for months uses the first letter of each month, except for May, June, July, and August which preferably use 'w, x, y, and z'.

In rare instances, a new applicant might have a birth date and initials that would produce the same number as described above. In an illustrative embodiment, in such instances, one more letter ranging from 'b' to 'z' is added to the number such as caRM51j01b. The number of characters would still be ten or less. In this embodiment, the letter 'a' is reserved for the original (first assigned) telephone number and might or, preferably, might not be used.

In another illustrative embodiment, the same telephone number is used for landline, facsimile, internet, and cellular service. This would be a major advance in technology. This is possible because of the four unique options provided by the upper and lower case of a subscriber's two-letter initials. For example, upper case 'RM' is used for a landline telephone, or 'Rm' for the facsimile address, or 'rM' for the internet, or lower case 'rm' for a cellular telephone. A person having ordinary skill in the art would understand that each combination of letters could be used for any of type of communications device. A major feature of this embodiment is that the two initials act as the telephone number. In this embodiment, when dialing a call using a number consisting of a recipient's two initials such as 'RM' and before pressing 'send', the telephone of the sender would be pre-programmed in its memory bank (or block) to convert the dialed 'RM' to RM51j01. For a call to 'JM' in Florida (FL), a typical conversion could be 1FLJM78x23, where the 'x' indicates the month of June. In this embodiment, if '~RM' were dialed, the call is directed to RM's office at ~GE.RM123. Preferably, the processor in the sending telephone performs conversions of any two to seven characters which the sender programs into the telephone. For example, in an illustrative embodiment, 'WG' is dialed to reach Walgreens drugs and, if 'RM' is taken, RM1 or the first two letters of RM's first name such as 'RE' for Renee, is dialed to reach Renee, etc. The simple task of dialing a known recipient by name with two to seven digits, without looking up, selecting, and dialing lengthy numbers, is a major breakthrough for owners, directors, managers, and parents who are instantly contacting their employees, agents, siblings, etc. For example, RM could contact her three children by simply dialing their initials 'jm', 'lm', or 'mm'.

The applicant understands that some users might object to the above system using birth dates for telephone numbers as an 'invasion of privacy'. In this case, an alternate system of six-character telephone numbers is provided, comprising two initials plus four characters comprising any letters that the user chooses, such as RMjohn, RMstar, or RMxxxx. These addresses could also be stored in the memory bank described above. In another alternative embodiment, a five-character version is provided.

The use of the same telephone number for four different services, by merely varying the case of the two initials, provides a huge advantage in operating the telecommunications system and provides a tremendous impact on area code capacity. The eight-character birth date system disclosed above provides each area code with 632.7 million landline (e.g., RM), 632.7 million facsimile (e.g., Rm), 632.7 million internet (e.g., rM), and 632.7 million cellular (e.g., rm) telephone numbers. The six-character backup privacy system provides each area code with 308.9 million telephone numbers for each of the 4 services designated by RM, Rm, rM, and rm. The 632.7 million and 308.9 million figures above are obtained by the cumulative multiplication of the number of variables of each character. The variables are 26 letters, 10 numbers, 12 months, and 30 days. For example, six digits with 26 variables (26×26×26×26×26×26) equals 308.9 million. With its ten digit telephone numbers and with seven digits in use in each area code, the present (background art) telecommunications system provides only 10 million telephone numbers per area code. Subtracting 2 million unused numbers starting with 0 or 1 and 80,000 numbers that are reserved, present area codes are left with only 7.92 million telephone numbers for all services.

Illustrative embodiments of this invention increase the cellular capacity of each area code from the present average of four million to an astounding 941.6 million. Thus, only one area code would ever be required per State. Area codes would be the well-known two-character code used by the U.S. Postal Service, such as AL, AK, AZ, AR, CA, etc. Area codes could be eliminated altogether, but a more illustrative embodiment maintains one area code per State, because of the existence of separate telephone companies and individual State laws, instead of processing telephone numbers in one system. Moreover, with this embodiment, there would be a fifty times larger choice of numbers; that is, one full set per State.

On international calls to the United States, Canada and the Caribbean countries, 350 different three-digit area codes are presently required by background art telecommunications systems. In an illustrative embodiment of the present invention, this cumbersome technique is replaced by the use of 50 two-digit (two-character) post office codes for each U.S. State, such as AL for Alabama, AK for Alaska, etc. Another 30 or so codes are required mainly for Canadian provinces and Caribbean countries. Moreover, in some embodiments of the invention, dialing a major U.S. company does not require dialing an area code. Dialing the letters of a U.S telephone number on international calls may be accomplished using a personal computer when the subscriber is not using the telephone line to establish an Internet connection. The latest cell phones could also be used. If only numbers can be dialed by a subscriber, conversion from numbers to letters is provided (e.g., by means of a processor and conversion tables).

Other examples of codes that may be used with some embodiments of the invention include: AS for American Somoa, FM for the Federated States of Micronesia, GU for Guam, MH for the Marshall Islands, MP for Northern Mariana Islands, PW for Palau, PR for Puerto Rico, UM for U.S. Minor Outlying Islands and VI for Virgin Islands of the U.S. Two digit (character) letter codes may also be created for each of the ten Canadian Provinces and its Yukon Territory and for Caribbean countries other than Puerto Rico and the Virgin Islands.

In an alternative embodiment, the use of eight characters for the birth date system is reduced to seven digits, for example, RM51j01. In this embodiment, the eighth character, as proposed above, is needed only in a rare case of someone having the same initials and year, month, and day of birth. In an illustrative embodiment, the problem is solved by providing the duplicate applicant with a backup privacy number such as RMxxx. With the birth date reduced from eight to seven characters, the capacity of each area code for cellular numbers is reduced from 632.7 million to 24.3 million numbers. The actual capacity would be 24.3 million landline plus 24.3 million cellular accounts, since both services have different numbering systems.

In another alternative embodiment, the backup privacy system is reduced one character from six characters to five characters. In this embodiment, the capacity of each area code for cellular numbers would drop from 308.9 million to 11.8 million, which is sufficient because these privacy numbers are likely to be selected by no more than twenty percent of the applicants. The area code capacity of the two systems would be 36.1 million cellular numbers per area code which is 10 times the present capacity.

The above disclosed reduction of one character may require one extra area code in the four States which currently exceed 12.8 million residents: Florida (18.2), New York (19.2), Texas (23.9), and California (36.5). In an illustrative embodiment, California is set up initially with two area codes: 'CA' and 'C1', or with 'CN' (north) and 'CS' (south). The two area codes, with 72.2 million cellular numbers, are expected to easily accommodate California's 36.5 million residents. This would eliminate twenty five California area codes. In this embodiment, the other three States are set up for a second area code if needed. In any case, the shorter version of the above telephone numbers outweighs the need of only four extra area codes and is therefore the illustrative embodiment. Use of another option depends on whether including the user's birthday month and date is considered an invasion of privacy. If it does, an alternate setup for the privacy number could be used by inserting any two characters (preferably letters) (xx) in place of the year born, e.g., RMxxj01. The applicant suspects that the shorter privacy number, e.g., RMxxx, would probably be illustrative by most users.

With an illustrative embodiment of this invention, each GE employee, for example, may reach any of GE's others employees simply by dialing the call to the recipient's initials (preferably first and last initials) such as 'RM'. This is preferably set up as a direct one-way serial transmission, or is directed to a GE memory bank or block for conversion of the telephone number to RM's office extension number. Many inputs of two or three characters could also be used, such as: RM1 (duplicate initials), CS (customer service), LOB (lobby), SEC (security) etc. With some employees, lower case initials could direct the call to a cellular telephone by converting the 'rm' input to the 'rm' birth date or privacy number, e.g., rm51j01, rmxxx, or rmxxj01.

In another illustrative embodiment, the website address (on the Internet) is obtained by adding a '.com' (dot corn) to the three unused digits of the business subscriber's telephone number and/or by using the lower/upper case (e.g., rM) of the initials of the individual's (non-business subscriber's) telephone number. Furthermore, by directing the user's internet browser to the above telephone number, access could be provided to an in-house website, which may not even be on the Internet. In a more illustrative embodiment, websites on the Internet are reachable directly with an alternate number such as the above telephone numbers, to which a prefix 'www' and a suffix '.com' or '.gov' etc. is added automatically or manually when dialed.

In another illustrative embodiment, telephone equipment in accordance with the invention is designed to process letters and numbers. Preferably, a communications device (e.g., a telephone) is provided that can answer at least two separate input phone numbers, either with a dual response line or with an extra line via its antenna. Preferably, the telephone equipment provides a user with the outstanding feature of having separate business and residence numbers on the same telephone. In illustrative embodiments, no new electronic design would be required. In this embodiment, the telephone is programmed for the work number and for either the birth date or the privacy system number.

This invention can be readily incorporated into the present-day communication system. Illustrative embodiments use the same ten digits that are presently used for telephone numbers. Primarily, new software would be required. Letter keys are already available on new cellular telephones which feature a computer keyboard. In these telephones, the same common integrated circuit chip, used in millions of personal computers, is available to convert each of up to 127 input keys, including upper case letters, lower case letters, numbers, punctuation, equivalence/tilde mark, etc., into a 7-bit binary symbol, in accordance with the standard ASCII digital coding scheme.

By dialing for companies with known ticker symbols, by dialing for individuals using known initials, by providing the U.S. Homeland Security Department with a major upgrade from this national tie-in of names, by using known State or other governmental jurisdictional area (e.g., province, territory, island or island group) abbreviations for area codes, by using only one area code per State or other governmental jurisdictional area, and by using only the two initials of the recipient to dial a call, etc, this invention offers tremendous superiority over the background art of an overloaded system of non-informative, hard-to-remember numbers with a clutter of 350 area codes.

In a telecommunications system that is capable of routing (operative to route) telephone calls to a specific communications device of a particular subscriber, an illustrative embodiment of the invention is a (routing) system for routing a telephone call from a caller to said specific communications device, said (routing) system comprising: means for assigning a first telephone number to the particular subscriber; and means for routing the telephone call to the specific communications device of the particular subscriber by recognizing said first telephone number; wherein if the telephone call is directed to a business that is located within the state in which the caller is located, said first telephone number comprises a tilde followed by a one-character to four-character stock ticker symbol.

In a telecommunications system that is capable of routing telephone calls to a specific communications device of a particular subscriber, an illustrative embodiment of the invention is a system for routing a telephone call from a caller to said specific communications device, said system comprising: means for assigning a first telephone number to the particular subscriber; and means for routing the telephone call to the specific communications device of the particular subscriber by recognizing said first telephone number; wherein, if the telephone call is directed to a business that is or may be located outside of the state, province, territory, island or island group in which the caller is located, said first telephone number is prefaced by a one and comprises a two-character state, province, territory, island or island group abbreviation or an indication that the state, province, territory, island or island group in which the subscriber is located is unknown (e.g., XX), followed by a tilde, followed by a one-character to four-character stock ticker symbol. Preferably, said first telephone number is prefaced by a one and comprises a two-character state abbreviation or a two-character indication that the state in which the subscriber is located is unknown, followed by a tilde, followed by a one-character to four-character stock ticker symbol, followed by one or more digits, a dot and one or more upper case letters, one or more lower case letters, or one or more lower case letters and one or more digits.

In a telecommunications system that is capable of routing telephone calls to a specific communications device of a particular subscriber, an illustrative embodiment of the invention is a system for routing a telephone call from a caller to said specific communications device, said system comprising: means for assigning a first telephone number to the particular subscriber; and means for routing the telephone call to the specific communications device of the particular subscriber by recognizing said first telephone number; wherein said first telephone number is selected from the group consisting of: if the telephone call is directed to a business that is located within the state in which the caller is located, a tilde followed by a one-character to four-character stock ticker symbol; and if the telephone call is directed to a business that is or may be located outside of the state in which the caller is located, a two-character state abbreviation or an indication that the state in which the subscriber is located is unknown, followed by a tilde, followed by a one-character to four-character stock ticker symbol, said first telephone being preceded by a one. Preferably, said first telephone number comprises a two-character state abbreviation or a two-character indication that the state in which the subscriber is located is unknown, followed by a tilde, followed by a one-character to four-character stock ticker symbol, followed by one or more digits, a dot and one or more upper case letters, one or more lower case letters, or one or more lower case letters and one or more digits. Preferably, said one-character stock ticker symbol is also followed by a tilde.

In another illustrative embodiment, the invention is a system for routing a telephone call having a ten character telephone number from a caller to a communications device of a business, said system comprising: a routing system for routing the telephone call to said communications device by recognizing the ten character telephone number; wherein said ten character telephone number comprises an abbreviation of the name of the state in which the business is located and an abbreviation of the name of the business. Preferably, the ten character telephone number comprises: a two-letter abbreviation of the name of the state, followed by a tilde, followed by a stock ticker symbol comprising one to four upper case letters. Preferably, said stock ticker symbol is followed by a dot and one or more upper case letters, or one or more lower case letters, or one or more lower case letters and one or more digits.

In another illustrative embodiment, the invention is a system for routing a telephone call having a nine or ten character telephone number from a caller to a communications device of a subscriber, said system comprising: a routing system for routing the telephone call to said communications device by recognizing the nine or ten character telephone number; wherein said nine or ten character telephone number comprises an abbreviation of the name of the state in which the subscriber subscribes (to the system), an abbreviation of the name of the subscriber and an abbreviation of the birth date of the subscriber. Preferably, the nine or ten character telephone number comprises: a two-letter abbreviation of the name of the state in which the subscriber subscribes, followed by a two-letter indication of the subscriber's first and last initials, followed by a two-digit indication of the birth year of the subscriber, followed by a one-letter indication of the birth month of the subscriber, followed by a two-digit indication of the birth date (the number of day of the month the subscriber was born) of the subscriber. Preferably, the nine or ten character telephone number would not include the name of the state if the call were being originated within that state. Preferably, if the nine or ten character telephone number is a land line number, the two letters used to indicate the name of the subscriber are upper case letters. Preferably, if the nine or ten character telephone number is a cellular number, the two letters used to indicate the name of the subscriber are lower case letters. Preferably, if the birth month of the subscriber is a month having the same first letter as another month, a letter other than the first letter of the month is used as the one-letter indication of one of the months. Preferably, the letters w, x, y and z are used to indicate May, June, July and August, respectively. In another illustrative embodiment, a letter in the range from b to z follows the two-digit indication of the birth date of the subscriber.

In a telecommunications system that is capable of routing telephone calls to a specific communications device of a particular subscriber, an illustrative embodiment of the invention is a system for routing a telephone call from a caller to said specific communications device, said system comprising: means for assigning a telephone number to the particular subscriber; and means for routing the telephone call to the specific communications device of the particular subscriber by recognizing said telephone number; wherein said telephone number is selected from the group consisting of: if the telephone call is directed to a business that is located within the state from which the caller is calling, a first telephone number comprising a tilde followed by a one-character to four-character stock ticker symbol; and if the telephone call is directed to a business that is or may be located outside of the state from which the caller is calling, a second telephone number comprising a two-character state abbreviation or an indication that the state in which the subscriber is located is unknown, followed by a tilde, followed by a one-character to four-character stock ticker symbol, said second telephone number being prefaced by a one. Preferably, said telephone number comprises a two-character state abbreviation or a two-character indication that the state in which the subscriber is located is unknown, followed by a tilde, followed by a one-character to four-character stock ticker symbol or a title symbol, followed by a directive code comprising one or more digits, a dot and one or more upper case letters, one or more lower case letters, or one or more lower case letters and one or more digits. Preferably, the (one or more) lower case letters are fax or cel. In another embodiment, the (one or more) lower case letters are an owner's or associate's name.

In a telecommunications system that is capable of routing telephone calls to a specific communications device of a non-business subscriber, an illustrative embodiment of the invention is a system for routing a telephone call from a caller to said specific communications device, said system comprising: means for assigning a telephone number to the non-business subscriber; and means for routing the telephone call to the specific communications device of the non-business subscriber by recognizing said telephone number; wherein said telephone number comprises the non-business subscriber's two-letter initials. Preferably, said two-letter initials comprise two upper-case letters if the specific communications device is a landline telephone, an upper-case letter followed by a lower-case letter if the specific communications device is a facsimile machine, a lower-case letter followed by an upper-case letter if the specific communications device is a computer having a browser or two lower-case letters if the specific communications device is a cellular telephone.

In an illustrative embodiment, any combination of upper-case letters and lower-case letters may be used for any type of specific communications device. In this embodiment, the caller presses send after entering the two characters, and before the call is routed, the two characters are converted into a seven-character telephone number, said seven-character telephone number comprising said two characters, a two-digit indication of the non-business subscriber's birth year, a one-letter indication of the non-business subscriber's birth month and a two-digit indication of the day in the non-business subscriber's birth month that the non-business subscriber was born. In an alternative embodiment, the two characters are converted into a five-character or six-character telephone number, said five-character or six-character telephone number comprising said two characters and three characters or four characters chosen by the non-business subscriber.

In another illustrative embodiment, the invention is a communication device of a subscriber (e.g., a telephone) that is configured to allow the subscriber to answer two separate telephone numbers without the subscriber having to select a separate telephone line. Preferably, the two separate telephone numbers comprise a business telephone number and a residence telephone number.

In yet another illustrative embodiment, the invention is a telecommunications system comprising: a call routing system and a plurality of telephones that are connected to said call routing system; wherein each of said telephones is situated within an area having an area code; and wherein said call routing system is operated by a software program that accepts one of the subscriber telephones numbers disclosed herein.

In another illustrative embodiment, the invention is a method of processing a telephone call to a subscriber, the method comprising: assigning one of the telephones numbers disclosed herein to the subscriber and routing the telephone call to the subscriber.

In yet another illustrative embodiment, the invention is a method of processing a telephone call to a subscriber, the method comprising: assigning a telephone number to the subscriber and routing the telephone call to the subscriber; wherein said telephone number is selected from the group consisting of: a substantially permanent company telephone number that consists of one to four characters, and a substantially permanent personal telephone number that consists of two initials of the subscriber or the first name of the subscriber; wherein said telephone number is used to direct calls to a landline, a facsimile machine, an interne connection or a cellular device; and wherein said telephone number comprises an area code if the caller is not in the same state as the subscriber and said area code consists of a two-character state designation. In some embodiments, said substantially permanent personal telephone number also consists of the birth date of the subscriber.

Further aspects of the invention will become apparent from consideration of the drawings and the ensuing description of illustrative embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently illustrative embodiments of the invention. In the drawings.

Figure 1:
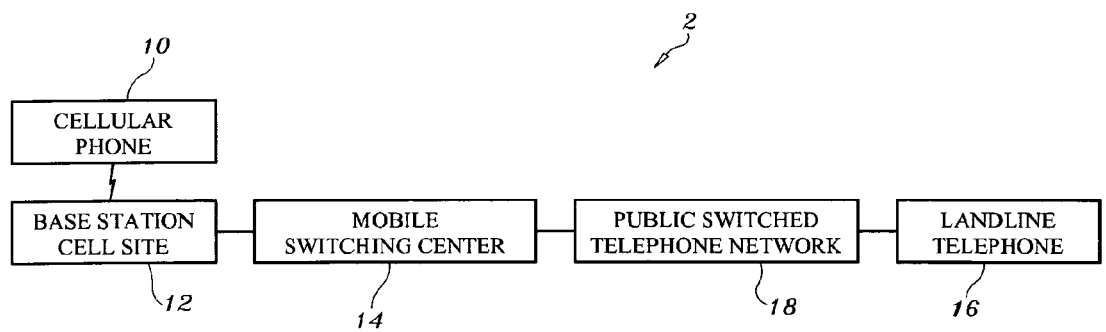
FIG. 1 is a block diagram of a telecommunications system in accordance with an illustrative embodiment of the invention.

The following reference numerals are used to indicate the parts and environment of the invention on the drawings:
   2 telecommunications system
   10 cellular phone
   12 base station, cell site
   14 mobile switching center
   16 land line telephone
   18 public switched telephone network

DETAILED DESCRIPTION OF THE INVENTION

Referring to FIG. 1, an illustrative embodiment of telecommunications system 2 is presented. In this embodiment, telecommunications system 2 comprises cellular phone 10, base station or cell site 12, mobile switching center 14, line telephone 16 and public switched telephone network 18. A detailed disclosure of an illustrative embodiment of a telecommunications system is presented in U.S. Pat. No. 7,039,174, which disclosure is incorporated by reference as if fully set forth herein.

In an illustrative embodiment, telecommunications system 2 routes telephone calls from caller to said specific communications devices. In this embodiment, telecommunications system 2 comprises means for routing the telephone call to a specific communications device of a particular subscriber by recognizing a telephone number. If the telephone call is directed to a business that is or may be located outside of the State in which the caller is located, the business telephone number is prefaced by a one and comprises a two-character state abbreviation or an indication that the State in which the subscriber is located is unknown (e.g., XX), followed by a tilde, followed by a one-character to four-character stock ticker symbol. Preferably, the business telephone number is prefaced by a one and comprises a two-character State abbreviation or a two-character indication that the State in which the subscriber is located is unknown, followed by a tilde, followed by a one-character to four-character stock ticker symbol, followed by one or more digits, a dot and one or more upper case letters, one or more lower case letters, or one or more lower case letters and one or more digits.

In another illustrative embodiment, telecommunications system 2 comprises a routing system for routing a telephone call to a communications device of a non-business subscriber by recognizing a nine or ten character telephone number. In this embodiment, the nine or ten character telephone number comprises an abbreviation of the name of the State in which the non-business subscriber subscribes to telecommunications system 2, an abbreviation of the name of the non-business subscriber and an abbreviation of the birth date of the non-business subscriber. Preferably, the nine or ten character telephone number comprises: a two-letter abbreviation of the name of the State in which the non-business subscriber subscribes, followed by a two-letter indication of the non-business subscriber's first and last initials, followed by a two-digit indication of the birth year of the non-business subscriber, followed by a one-letter indication of the birth month of the non-business subscriber, followed by a two-digit indication of the day of the month in which the non-business subscriber was born. Preferably, the nine or ten character telephone number would not include the name of the State if the call were being originated within that State. Preferably, if the nine or ten character telephone number is a land line number, the two letters used to indicate the name of the subscriber are upper case letters. Preferably, if the nine or ten character telephone number is a cellular telephone number, the two letters used to indicate the name of the subscriber are lower case letters. Preferably, if the birth month of the subscriber is a month having the same first letter as another month, a letter other than the first letter of the month is used as the one-letter indication of one of the months. Preferably, the letters w, x, y and z are used to indicate May, June, July and August, respectively. In another illustrative embodiment, a letter in the range from b to z follows the two-digit indication of the birth date of the non-business subscriber.

In another illustrative embodiment, the invention is a method of processing a telephone call to a subscriber, the method comprising: assigning a telephone number to the subscriber and routing the telephone call to the subscriber; wherein said telephone number is either a substantially permanent company telephone number that consists of one to four characters, or a substantially permanent (e.g., life long) personal telephone number that consists of two initials of the subscriber or the first name of the subscriber; wherein said telephone number is used to direct calls to a landline, a facsimile machine, an interne connection or a cellular device; and wherein said telephone number comprises an area code if the caller is not in the same state as the subscriber and said area code consists of a two-character state designation. In some embodiments, said substantially permanent personal telephone number also consists of the birth date of the subscriber.

Many variations of the invention will occur to those skilled in the art. Some variations include telephone numbers that comprise an indication of a stock ticker symbol of a business subscriber. Other variations call for telephone numbers that comprise an indication of the name of a non-business subscriber. All such variations are intended to be within the scope and spirit of the invention.

Although some embodiments are shown to include certain features, the applicant specifically contemplates that any feature disclosed herein may be used together or in combination with any other feature on any embodiment of the invention. It is also contemplated that any feature may be specifically excluded from any embodiment of the invention.

What is claimed is:

1. In a telecommunications system that is operative to route telephone calls to a specific communications device of a particular subscriber, a routing system for routing a telephone call from a caller to said specific communications device, said routing system comprising:
    means for assigning a telephone number to the particular subscriber; and
    means for routing the telephone call to the specific communications device of the particular subscriber by recognizing said telephone number;
    wherein, if the telephone call is directed to a business that is located within the state, province, territory, island or island group in which the caller is located, said first telephone number comprises a tilde followed by a one-character to four-character stock ticker symbol of the business; and
    wherein, if the telephone call is directed to a business that is located outside of the state, province, territory, island or island group in which the caller is located, said first telephone number is prefaced by a one and comprises a two-character state, province, territory island or island group abbreviation or an indication that the state, province, territory, island or island group in which the subscriber is located is unknown, followed by a tilde, followed by a one-character to four-character stock ticker symbol.

2. The system of claim 1 wherein said telephone number is prefaced by a one and comprises said two-character state abbreviation or said two-character indication that the state in which the subscriber is located is unknown, followed by a tilde, followed by a one-character to four-character stock ticker symbol, followed by one or more digits, a dot and one or more upper case letters, one or more lower case letters, or one or more lower case letters and one or more digits.

3. In a telecommunications system that is capable of routing telephone calls to a specific communications device of a particular subscriber, a system for routing a telephone call from a caller to said specific communications device, said system comprising:
    means for assigning a first telephone number to the particular subscriber; and
    means for routing the telephone call to the specific communications device of the particular subscriber by recognizing said first telephone number;
    wherein said first telephone number is selected from the group consisting of:
        if the telephone call is directed to a business that is located within the state in which the caller is located, a tilde followed by a one-character to four-character stock ticker symbol; and
        if the telephone call is directed to a business that is located outside of the state in which the caller is located, a two-character state abbreviation or an indication that the state in which the subscriber is located is unknown, followed by a tilde, followed by a one-character to four-character stock ticker symbol, said first telephone number being preceded by a one.

4. The system of claim 3 wherein said telephone number comprises said two-character state abbreviation or said two-character indication that the state in which the particular subscriber is located is unknown, followed by said tilde, followed by said one-character to four-character stock ticker symbol of the business, followed by one or more digits, a dot and one or more upper case letters, one or more lower case letters, or one or more lower case letters and one or more digits.

5. The system of claim 3 wherein said one-character stock ticker symbol of the business is also followed by a tilde.

6. A system for routing a telephone call having a ten character telephone number from a caller to a communications device of a business, said system comprising:
    a routing system for routing the telephone call to said communications device by recognizing the ten character telephone number;
    wherein the ten character telephone number comprises a two-letter abbreviation of the name of the state in which the business is located, followed by a tilde, followed by a stock ticker symbol comprising one to four upper case letters, followed by a dot and one or more upper case letters, or one or more lower case letters, or one or more lower case letters and one or more digits.

7. A system for routing a telephone call having a nine or ten character telephone number from a caller to a communications device of a subscriber, said system comprising:
   a routing system for routing the telephone call to said communications device by recognizing the nine or ten character telephone number;
   wherein the nine or ten character telephone number comprises a two-letter abbreviation of the name of the state in which the subscriber subscribes, followed by a two-letter indication of the subscriber's first and last initials, followed by a two-digit indication of the birth year of the subscriber, followed by a one-letter indication of the birth month of the subscriber, followed by a two-digit indication of the birth date of the subscriber.

8. The system of claim 7 wherein, if the nine or ten character telephone number is a landline number, the two letters used to indicate the name of the subscriber are upper case letters.

9. The system of claim 7 wherein, if the nine or ten character telephone number is a cellular number, the two letters used to indicate the name of the subscriber are lower case letters.

10. The system of claim 7 wherein, if the birth month of the subscriber is a month having the same first letter as another month, a letter other than the first letter of the month is used as the one-letter indication of one of the months.

11. The system of claim 7 wherein the letters w, x, y and z are used to indicate May, June, July and August, respectively.

12. The system of claim 7 wherein a letter in the range from b to z follows the two-digit indication of the birth date of the subscriber.

13. In a telecommunications system that is operative to route telephone calls to a specific communications device of a particular subscriber, a routing system for routing a telephone call from a caller to said specific communications device, said routing system comprising:
   means for assigning a telephone number to the particular subscriber; and
   means for routing the telephone call to the specific communications device of the particular subscriber by recognizing said telephone number;
   wherein said telephone number is selected from the group consisting of:
      if the telephone call is directed to a business that is located within the state from which the caller is calling, a first telephone number comprising a tilde followed by a one-character to four-character stock ticker symbol; and
      if the telephone call is directed to a business that is located outside of the state from which the caller is calling, a second telephone number comprising a two-character state abbreviation or an indication that the state in which the subscriber is located is unknown, followed by a tilde, followed by a one-character to four-character stock ticker symbol.

14. The system of claim 13 wherein said first telephone number comprises said two-character state abbreviation or said two-character indication that the state in which the subscriber is located is unknown, followed by said tilde, followed by said one-character to four-character stock ticker symbol or a title symbol of the business, followed by a directive code comprising one or more digits, a dot and one or more upper case letters, one or more lower case letters, or one or more lower case letters and one or more digits.

15. The system of claim 14 wherein said one or more lower case letters are fax or cel.

16. The system of claim 14 wherein said one or more lower case letters are an owner's or associate's name.

17. In a telecommunications system that is capable of routing telephone calls to a specific communications device of a non-business subscriber, a system for routing a telephone call from a caller to said specific communications device, said system comprising:
   means for assigning a telephone number to the non-business subscriber; and
   means for routing the telephone call to the specific communications device of the non-business subscriber by recognizing said telephone number;
   wherein said telephone number comprises the non-business subscriber's two-letter initials; and
   wherein said two-letter initials comprise two upper-case letters if the specific communications device is a landline telephone, an upper-case letter followed by a lower-case letter if the specific communications device is a facsimile machine, a lower-case letter followed by an upper-case letter if the specific communications device is a computer having a browser or two lower-case letters if the specific communications device is a cellular telephone.

18. A method of operating a telecommunications system that is capable of routing telephone calls to a specific communications device of a non-business subscriber, said telecommunications system comprising a subsystem for routing a telephone call from a caller to said specific communications device, said method comprising:
   the caller's entering two characters comprising a combination of one upper-case letter and one lower case letter, two upper-case letters or two lower-case letters to indicate the type of specific communications device to which the call is being directed;
   the caller's pressing send after entering the two characters and before the call is routed; and
   the telecommunications system's converting the two characters into a seven-character telephone number, said seven-character telephone number comprising said two characters, a two-digit indication of the non-business subscriber's birth year, a one-letter indication of the non-business subscriber's birth month and a two-digit indication of the day in the non-business subscriber's birth month that the non-business subscriber was born or converting the two characters into a five-character or six-character telephone number, said five-character or six-character telephone number comprising said two characters and three characters or four characters chosen by the non-business subscriber.

19. The method of claim 18 wherein the specific communications device of the non-business subscriber is configured to allow the non-business subscriber to answer two separate telephone numbers without the non-business subscriber having to select a separate telephone line.

20. The method of claim 19 wherein the two separate telephone numbers comprise a business telephone number and a residence telephone number.

21. A telecommunications system comprising:
   a call routing system and a plurality of telephones that are connected to said call routing system;
   wherein each of said telephones is situated within an area having an area code; and wherein said call routing system is operated by a software program that accepts one of the telephone numbers selected from the group consisting of:

if the telephone call is directed to a business that is located within the state, province, territory, island or island group in which the caller is located, said first telephone number comprises a tilde followed by a one-character to four-character stock ticker symbol, if the telephone call is directed to a business that is located outside of the state, province, territory, island or island group in which the caller is located, said first telephone number is prefaced by a one and comprises a two-character state abbreviation or an indication that the state, province, territory, island or island group in which the subscriber is located is unknown, followed by a tilde, followed by a one-character to four-character stock ticker symbol.

22. The system of claim 21 wherein said telephone number is prefaced by a one and comprises a two-character state abbreviation or a two-character indication that the state in which the subscriber is located is unknown, followed by a tilde, followed by a one-character to four-character stock ticker symbol of the business, followed by one or more digits, a dot and one or more upper case letters, one or more lower case letters, or one or more lower case letters and one or more digits.

23. A method of processing a telephone call to a subscriber, the method comprising:

assigning a telephone number to the subscriber and routing the telephone call to the subscriber;

wherein said telephone number is selected from the group consisting of:

a substantially permanent company telephone number that consists of one to four characters, and a substantially permanent personal telephone number that consists of two initials of the subscriber or the first name of the subscriber;

wherein said telephone number is used to direct calls to a landline, a facsimile machine, an internet connection or a cellular device;

wherein said telephone number comprises an area code if the caller is not in the same state as the subscriber and said area code consists of a two-character state designation; and wherein said substantially permanent personal telephone number also consists of the birth date of the subscriber.

\* \* \* \* \*